United States Patent Office 3,182,693
Patented May 11, 1965

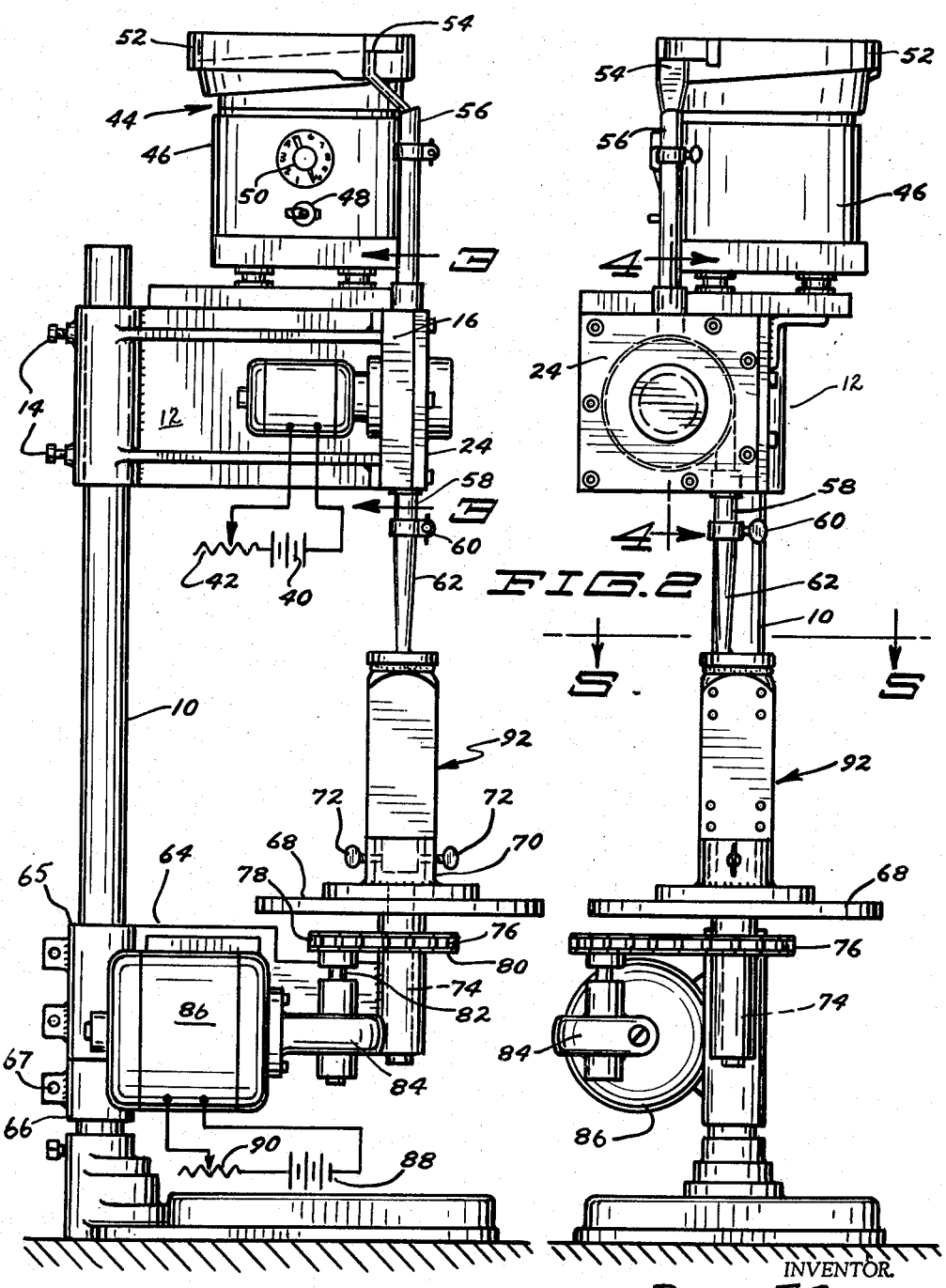

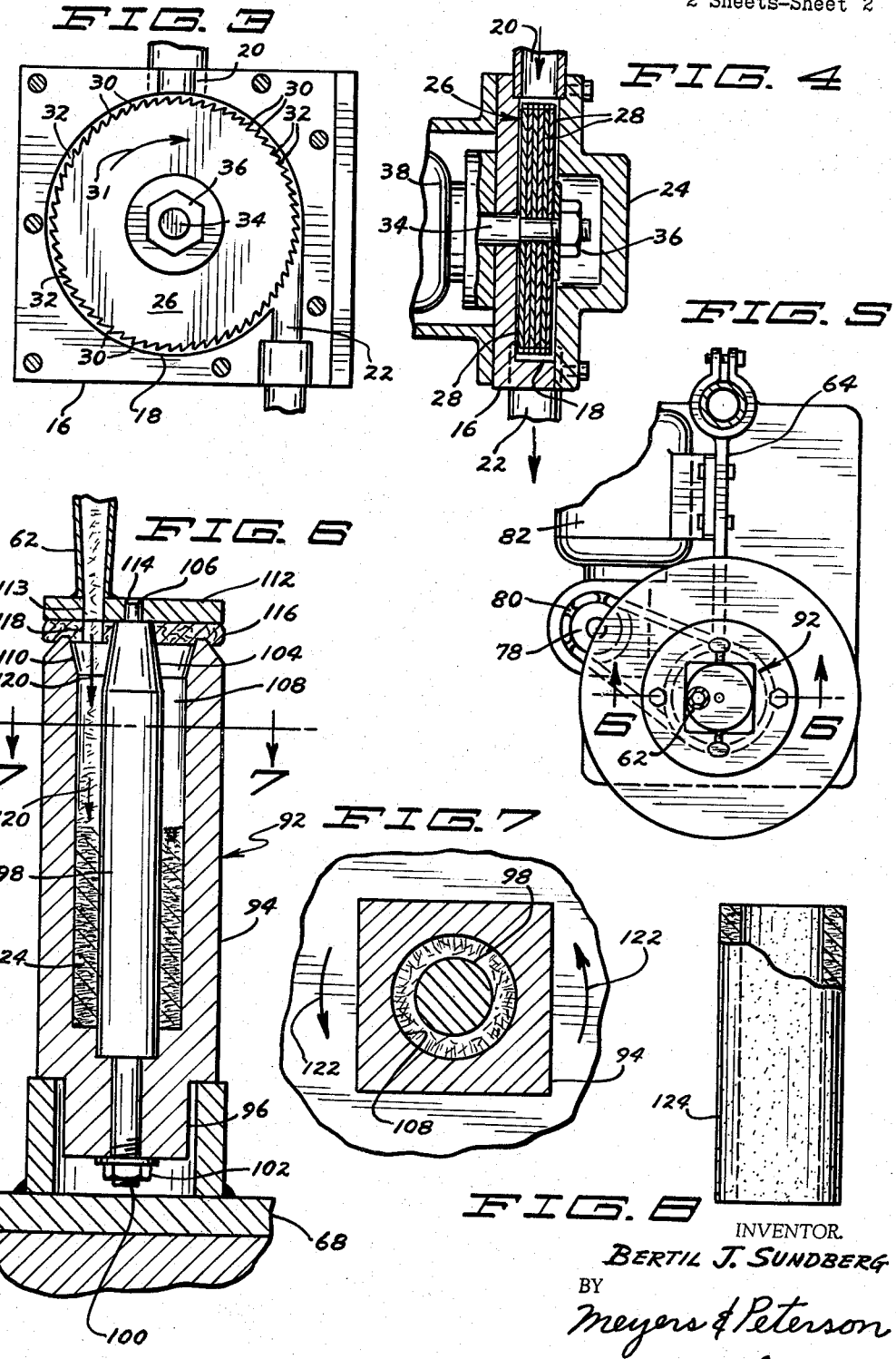

3,182,693
MACHINE FOR MAKING FILTER STRUCTURES
Bertil J. Sundberg, Minneapolis, Minn., assignor to G. H. Tennant Company, Minneapolis, Minn., a corporation of Minnesota
Filed Aug. 13, 1962, Ser. No. 216,421
2 Claims. (Cl. 141—71)

This invention relates to apparatus for making filter elements, and pertains more particularly to a machine for progressively impinging discrete filter media into a mold to form a filter structure.

One important object of the present invention is to provide a machine for making filter structures having a uniform density throughout. More specifically, it is an aim of the invention to avoid the use of an air stream that creates disturbances and variations in the density of the resulting filter element. Stated somewhat differently, the invention contemplates the control of the degree of compactness resulting from the building up of a filter structure from discrete filter media.

The invention also has for an object the making of a filter element that has a high ratio of dirt or constituent retention for a given mass of filter media.

At the outset it should be pointed out that the particular filter media is relatively unimportant to a practicing of the invention. Generally speaking, though, the media may be considered to consist of bulk material. More specifically, such unwoven material will usually be of a fibrous character, although granular or powdered materials might be employed in certain instances. Included among the possible fibrous materials would be fibers of metal, synthetic materials, asbestos, cotton, wool, and the like. Thus, the media may be organic or inorganic. Because the type of filter material can vary so widely as to size and composition, depending largely upon the use to which the filter element is to be put, the term "discrete filter media" will be used throughout in a generic sense, and is to be considered as embracive of the various materials that have been mentioned, although obviously not restricted thereto.

These and other objects and advantages of my invention will more fully appear from the following description, made in connection with the accompanying drawings, wherein like reference characters refer to the same or similar parts throughout the several views and in which:

FIGURE 1 is a side elevational view of one form my machine may assume;

FIGURE 2 is a front elevational view corresponding to FIGURE 1;

FIGURE 3 is a view of the sawtooth projection wheel, the view being taken along the line 3—3 of FIGURE 1;

FIGURE 4 is a sectional view taken in the direction of line 4—4 of FIGURE 2 for the purpose of showing the cross sectional make-up of the projection wheel of FIGURE 3 and the housing enclosing same;

FIGURE 5 is a sectional view taken in the direction of line 5—5 of FIGURE 2 for the purpose of showing the upper end of the mold that is used when practicing the invention;

FIGURE 6 is a longitudinal sectional view of the mold, the view being taken in the direction of line 6—6 of FIGURE 5;

FIGURE 7 is a sectional view of the mold taken in the direction of line 7—7 of FIGURE 6; and FIGURE 8 is an elevational view, partly in section, of a filter element after its removal from the mold of FIGURE 6.

Referring first to FIGURES 1 and 2, a stand has been denoted generally by the reference numeral 10. An upper bracket or arm 12 is supported on the stand 10 and is held in an adjusted vertical position thereon by means of a pair of set screws 14.

At the free or distal end of the bracket 12 is a housing 16 having a cylindrical interior chamber 18 (FIGURES 3 and 4) provided with a radially directed inlet passage 20 and a tangentially directed outlet passage 22. The housing 16 includes a removable face plate 24 for the purpose of affording access to the chamber 18.

Within the chamber 18 of the housing 16 is a projection wheel 26. This wheel is of a stacked construction, being comprised of a number of discs or laminations 28. Although susceptible to different configurations, protuberances in the form of saw teeth 30 are formed about the periphery of the wheel 26. The wheel 26 is designed to be rotated in a clockwise direction as viewed in FIGURE 3, an arrow 31 having been applied to show the direction. The saw teeth 30, therefore, are preferably formed with a radial edge on the forward side thereof and a more gradual rearwardly sloping edge on the trailing side. The saw teeth 30, it will be observed, form angularly spaced notches or grooves 32 around the circumference of the wheel 26. These notches or grooves 32 function as recesses or pockets, and the configuration thereof can be varied depending upon the type and design of protuberances employed for the particular filter media employed. Inasmuch as saw teeth 30 have been utilized in the illustrative situation, the notches or grooves 32 result.

In order to provide for rotation of the wheel 26 about a horizontal axis, the wheel is mounted on a shaft 34 and held thereon by a retaining nut 36. As best viewed in FIGURES 1 and 4, the shaft 34 is mechanically connected to an electric motor 38. The motor 38 is energized from a suitable power source 40 and the speed of the motor can be controlled by a rheostat 42 or other means. It might be explained at this stage that the fibers or other discrete filter media will have imparted thereto through the agency of the projection wheel 26 a particular momentum best suited for the fabrication of the filter element that is desired. As already pointed out, various factors enter into the construction of the filter element. For instance, the pressure drop across the filter is a governing factor, as would be the sizes of the particles to be removed from the fluid passing through the filter. However, the specific reason for varying the speed of the motor 38, and hence the rotative speed of the wheel 26, will be better understood as the description progresses.

Surmounted on the bracket 12 is a vibratory conveyor mechanism 44 for delivering the discrete filter media to the housing 16. Although this mechanism 44 is fully described in Patent No. 2,696,292 issued to William V. Spurlin on December 7, 1954, it can be pointed out quite briefly that it includes a casing 46 in which is housed an electromagnetic motor for producing desired vibrations, such motor being in circuit with a feed switch 48 and having its speed controlled by the knob 50. Atop the casing 46 is a feed bowl 52 having a spiral track or raceway (not visible) within the confines thereof, the raceway extending upwardly from the floor or bottom of the bowl through an elevated discharge point labeled 54. Providing communication between the elevated discharge point 54 and the inlet passage 20 is a vertical chute 56 through which the filter media that is placed in the bowl 52 can fall after it is elevated.

Although the action that takes place within the housing 16 is better reserved for discussion when considering an operational sequence hereinafter presented, it can be stated that the role played by the wheel 26 is for the purpose of imparting momentum to the various fibers or particles constituting the discrete filter media. Inasmuch as this discrete media is projected downwardly via the tangential outlet passage 22, a second vertical chute 58 is disposed beneath this outlet passage, actually providing a continuation thereof. A clamp 60 fastens a nozzle 62 to the lower end of the chute 58, the nozzle having a tapering configuration which provides a discharge opening at the lower end thereof of reduced section. This slight taper better directs the filter media into a mold that is soon to be referred to.

At this time, attention is called to a lower bracket or arm 64 provided with an integral sleeve 65 that is vertically positionable on the stand 10 through the agency of an adjustable collar 66 which can be held at the appropriate height by one or more clamping screws 67. This mounting arrangement permits the bracket or arm 64 to be swung horizontally. The bracket or arm 64 supports a turntable 68 having a sleeve 70 fixedly secured thereto for a purpose soon to be explained. Also, it is to be observed that the sleeve 70 is provided with a pair of set screws for holding a portion of the mold still to be described. The turntable 68 is rotatable about a vertical axis by reason of a shaft 74 having a driven sprocket 76 thereon. A drive sprocket 78 has a chain 80 entrained thereabout, this same chain also encircling the sprocket 76 so as to impart rotation to the turntable. There is a shaft 82 associated with a gear housing 84; this shaft 82 has the drive sprocket 78 mounted on its upper end. For the purpose of providing rotative power to the turntable 68 via the chain and sprocket arrangement above described there is an electric motor 86 connected to a suitable power source 88, the speed of the motor 86 being controllable by a rheostat 90 or other appropriate means. Hereagain, the reason for controlling the speed of the motor 86 will be better appreciated when considering the typical fabrication of a filter structure.

Describing now the mold in which the filter element is made, this mold (best viewed in FIGURE 6) being designated generally by the reference numeral 92, it will be noted that it includes a casing 94 having a boss 96 at its lower end which boss is receivable in the previously mentioned sleeve 70 and held fast therein by the set screws 72. The mold 92 further includes a core 98 having a threaded shank 100 at its lower end which permits the core to be fixedly held in place, a retaining nut 102 assuring that there will be no displacement of the core 98 with respect to its outer cylindrical casing 94. The upper end of the core 98 is tapered at 104 and terminates in an integral tip or pin 106.

From what has been said with respect to the construction of the mold 92, it can be seen that the core 98 forms with the cylindrical interior of the casing 94 a confined annular cavity 108 having a flaring upper end by reason of the taper at 104 plus a beveling at 110 adjacent the upper end of the cylindrical casing 94. It will be discerned from FIGURE 6 that the lower end of the nozzle 62 is aligned with the annular cavity 108. Although carried by the nozzle 62, a plate 112 may be said to constitute an additional part belonging to the mold 92. The plate 112 is movable into juxtaposition with the circular upper end of the casing 94 so as to close the annular cavity 108 with the exception of the outlet at the lower end of the nozzle 62. Hence, the plate 112 is formed with an aperture 113 in permanent registry with the lower end of the nozzle 62. A second aperture 114 in the plate 112 is provided for the accommodation of the pin or tip 106 at the upper end of the core 98. Consequently, the plate 112 serves as an upper bearing for the mold 92. A resilient seal 116, such as felt, effectively prevents any escape of the discrete filter media, this seal being adhered to the underside of the plate 112. The seal 116 has an aperture 118 therein which permits the filter media to pass through after traversing the aperture 113 in the plate 112. The seal 116 is also configured so as to encircle the tapered portion 104 of the core 98 so as to permit rotation of the core with the rest of the mold 92.

Having presented the foregoing information, the operation of my machine should be readily comprehended.

Assuming that the appropriate discrete filter media has been placed in the feed bowl 52 of the vibratory conveyor mechanism 44, the switch 48 is turned on and the rate of feed of the media would be appropriately determined by properly positioning the knob 50. The rate of feed cannot be so great as to clog or choke the vertical chute 56. The fibrous or particulate matter constituting the filter media must be projected from the wheel 26 in individual fashion.

The wheel 26, by reason of the saw teeth 30 and the intervening notches or grooves 32 literally tears apart any matted or balled bodies of fibers coming through the chute 56 and picks up individual fibers, changing their direction from a vertical one to a circular one. During this sequence of events, the media is accelerated and a considerable momentum is imparted to each separate fiber or particle. The accelerated media is continually flung in a tangential direction outwardly through the outlet passage 22. Continued movement of the discrete filter media downwardly causes the media to pass through the nozzle 62. Consequently, the nozzle 62 impinges the media into the annular cavity 108 of the mold 92.

The motor 86 is instrumental in rotating the turntable 68 and hence the mold 92 at a desired rate. Because of the continued rotation of the mold 92 about a vertical axis, it follows that the filter media is added to the cavity 108 in a spiral fashion. This spiraling action progresses upwardly until the entire filter element or mat has been made. What occurs, then, is that the filter media enters the annular cavity 108 in the direction indicated by the arrows 120. While this is happening, the mold 92 is being rotated in the direction of the arrows 122, as indicated in FIGURE 7.

The continued introduction of the discrete filter media into the cavity 108 results in the formation of a tubular filter element or structure labeled 124. This structure 124 is shown in FIGURE 8 after its removal from the mold 92.

It is important to appreciate that the impingement of the discrete filter media into the mold 92 is without the assistance of any air blast or air stream. Hence, there is no evacuation problem encountered with respect to getting rid of air that would otherwise be directed into the mold. In other words, the mold 92 is a closed mold and there is no objectionable blow-back that would randomly shift and move the filter media during the filter fabrication procedure. Owing to this state of affairs, a product having an exceptionally high uniformity with respect to its density is derived. It will be understood that the density itself can be controlled by relating the speeds of both of the motors 38 and 86 with respect to each other. For instance, if a relatively fluffy or loose structure 124 is desired, then the speed at which the projection wheel 26 rotates can be reduced. By varying the rotative speed of the mold 92, the degree of compactness of the filter media can be controlled still further. Thus, while the density of the filter structure 124 is susceptible to variation, it still follows that the ensuing density will be of uniform character.

It will, of course, be understood that various changes may be made in the form, details, arrangements, and proportions of the parts without departing from the scope of my invention as set forth in the appended claims.

What is claimed:

1. A machine for making filter structures comprised of individual fibers of material compressed together in a mold to form a filter mat, said machine comprising a closed mold system including a source of fibers, a housing having a substantially cylindrical chamber, a toothed projection wheel mounted in said chamber, the outer periphery of said projection wheel being closely spaced from the inner surface of said housing chamber, said chamber being closed except for an inlet opening open to the source of fibers and an outlet opening extending substantially tangentially to the outer surface of the toothed wheel, enclosed feed means leading from said outlet opening to form a channel aligned with the tangential discharge opening, a mold having a tubular chamber with the longitudinal dimension thereof aligned with the feed means, said mold being air tight except for an opening leading to said enclosed feed means, and means to rotate said toothed wheel in a direction to engage fibers at the chamber inlet opening and project them from the discharge opening, said teeth on said wheel each having a rotationally leading radial face surface, said face surface being of small enough radial dimension so that substantially no airflow results as the wheel rotates, and means to rotate said mold about its longitudinal axis.

2. The combination as specified in claim 1 wherein said means to rotate said mold about its longitudinal axis and said means for driving said toothed wheel are both variable in speed.

References Cited by the Examiner
UNITED STATES PATENTS

| | | | |
|---|---|---|---|
| 1,707,117 | 3/29 | Foster | 22—58.5 XR |
| 1,931,570 | 10/33 | Brown et al. | |
| 2,680,899 | 6/54 | Sebok et al. | 141—73 XR |
| 2,870,054 | 1/59 | Amos et al. | 156—74 XR |
| 3,012,922 | 12/61 | Wiltshire. | |

LAVERNE D. GEIGER, *Primary Examiner.*